UNITED STATES PATENT OFFICE.

FREDERICK G. KEYES, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

PRODUCTION OF METALLIC TUNGSTEN POWDER.

1,270,842.     Specification of Letters Patent.     Patented July 2, 1918.

No Drawing.     Application filed July 6, 1914. Serial No. 849,272.

*To all whom it may concern:*

Be it known that I, FREDERICK G. KEYES, a citizen of the United States, and resident of East Orange, county of Essex, State of New Jersey, have invented certain new and useful Improvements in the Production of Metallic Tungsten Powder, of which the following is a specification.

The reduction of tungsten oxid in a stream of dry hydrogen to produce a metallic powder is already well known in the arts. When, however, the usual process is employed, the resulting powder is not a pure metallic tungsten powder but is an impure form of tungsten having the disabilities which belong to all forms of tungsten except the pure metal. In the chemical reaction commonly employed, one had to deal with an equilibrium between $WO_3$ or other oxid of tungsten, hydrogen, and water vapor. To obtain by this method pure tungsten unmixed with oxids would require the use of absolutely dry and oxygen-free hydrogen and it would also be necessary that the water vapor formed during the reaction should be removed mechanically by employing a current of hydrogen of sufficient volume not only to reduce the tungsten oxid or oxids but to rinse water vapor away from the vicinity of the reaction. Owing to the fact that water vapor is evolved throughout the whole course of the reaction, this would evidently require a very long time, practically an infinite time, when it is recollected that access of $H_2$ and escape of water vapor must proceed by diffusion through the bulk of the powdered oxids.

Now, it is very desirable for many purposes, to obtain tungsten free from all impurities. It is well known that very minute traces of impurities affect the properties of pure metals in one way or another. Note, for example, the effect of small amounts of carbon, sulfur, phosphorus, or silicon on iron. The presence of even a small amount of slag in iron results, when the iron is worked, as for example rolled into bars, in an action wherein the particles of slag extend themselves, forming gliding surfaces such as to prevent perfect welding of the metal. The resulting product then becomes fibrous in effect. In fact, it is true that maximum ductility and maximum malleability are attained along with maximum purity. In the case of tungsten, Moissan, who prepared tungsten in the electric furnace as early as 1893, comments on the extreme hardness and unworkability of carbon-bearing tungsten as compared with almost carbon-free tungsten which latter he states was malleable, soft enough to file, and could be welded at a temperature far below its melting point. In fact the product obtained by Moissan was not only malleable and capable of being welded at a temperature below its melting point but it was also ductile.

The lowest oxid of tungsten would have the composition WO corresponding to the structural formula

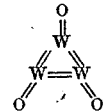

since tungsten has a valence of six. Ten per cent. of this oxid present in metallic tungsten would therefore correspond to only about .8% total of oxygen. This might be considered a practically pure tungsten product. One per cent. of oxid would, of course, give a mixture which analyzes 99.92%W. Less than 1% of oxid could not be determined by chemical analytical methods, so that a product like that described above would be pronounced chemically pure. Should, however, the amount of oxid present equal one per cent. such a state of impurity could barely be detected by analytical methods and that amount of impurity would affect the ductility and structure of the product.

Broadly, then, it may be stated that the presence of oxid is highly objectionable. Accordingly, an improvement would result in respect to the properties of the final product, if metallic tungsten could be procured in a manner which would insure the absence of all impurities or oxids.

As an example of what may be done in this regard, if sodium or calcium is added to tungsten trioxid reactions are obtained whereby pure tungsten is separated, in the case of sodium into tungsten and sodium oxid and in the case of calcium into tungsten and calcium oxid. These reactions take place readily at low temperatures.

Any tungsten oxid, halid, or oxy-halid, may, of course, be substituted for the tungsten trioxid which has been taken as an example.

One of the difficulties of the situation has been that it is ordinarily impossible, mechanically, to obtain an intimate and complete mixture of sodium or calcium with the powdered tungsten oxid, a difficulty which I avoid in the following manner: Liquid ammonia dissolves large quantities of the alkali metals and also metallic calcium. I have mentioned sodium as a characteristic alkali metal primarily on account of its low price and low atomic weight. I do not, however, wish to be limited to the choice of sodium since all the alkali metals are soluble in liquid ammonia. Side reactions must also be prevented, such, for example, as the formation of $NaNH_2$, or sodamid, which catalyzes the reaction $2Na+2NH_3=2NaNH_2+H_2$. Consequently it is essential to dry the liquid ammonia in advance which may be conveniently done by distilling liquid ammonia into the required quantity of sodium. When the sodium is completely in solution, the necessary quantity of dry tungstic acid compound, such as tungsten tri-oxid, may be added and the mixture stirred. The ammonia may then be distilled from the mixture of sodium and tungstic acid. When the mixture is ammonia-free it may be warmed slowly to about 500 to 600 degrees C. and maintained at that temperature until the reaction is completed. It is obvious that an excess of sodium should be present to insure that the reaction goes to completion. After the reaction is completed a small amount of dry methyl alcohol may be added which reacts gently with the excess of sodium, after which the mass may be stirred up with water and the pure tungsten powder separated by filtration.

The procedure has been described in detail, using sodium and tungstic acid ($WO_3$) as examples, but it is evident that the reaction may be carried out with calcium or with any oxid of tungsten. One advantage of using sodium, in addition to those already mentioned, is that its oxid dissolves in water whereas CAO is sparingly soluble in water. A simplification of the work of separating the tungsten powder is accordingly realized.

The pure powder obtained as above may be compressed into bars and sintered and, in general, worked into desired shapes after the method employed by W. E. Staite in connection with iridium designed to be used in iridium wire electric lamps (British Patent 12,212 of 1848). The details of this method are well known to those skilled in the art of working metals and need not be described here.

The described action of the alkali metals is the same as that of calcium which is an alkaline earth metal. As a comprehensive term designed to cover not only the metals which are commonly designated as alkali metals but also such alkaline earth metals as can be used for the purposes of the present invention, I employ in one or more of the claims the term "alkali metals".

I claim as my invention:

1. The method of removing from metal compounds having free energy constants the ingredients combined therewith, which consists in subjecting the said compounds to the influence of a metal dissolved in ammonia, the corresponding compound of which has a greater free energy constant than that of the said compounds to be treated, and heating the mixture.

2. The method of removing from metal compounds having free energy constants the ingredients combined therewith, which consists in subjecting the said compounds to the influence of a metal of the alkali group dissolved in ammonia, the corresponding compound of which has a greater free energy constant than that of the said compounds to be treated, and heating the mixture.

3. The method of removing from tungsten compounds the ingredients combined with the tungsten, which consists in subjecting the compounds to the influence of a metal of the alkali group dissolved in ammonia and heating the mixture.

4. The method of removing oxygen from tungsten compounds of oxygen, which consists in subjecting said compounds to the influence of metals of the alkali group dissolved in liquid ammonia and heating the mixture.

5. The method of removing the strong negative electro elements from tungsten compounds, which consists in subjecting the compounds to the influence of metals of the alkali group while dissolved in liquid ammonia and heating the mixture.

6. The method of obtaining an intimate mixture of powdered tungsten oxid and an alkali metal, which consists in dissolving the metal in liquid ammonia and adding to the mixture an oxid of tungsten.

7. The method of reducing an intimate and complete mixture of powdered tungsten oxid and an alkali metal, which consists in dissolving the metal in liquid ammonia, adding an oxid of tungsten, stirring the mixture, distilling off the ammonia and heating the resulting mixture slowly to about 500 to 600 degrees centigrade.

8. The method of reducing tungsten oxid with an alkali metal, which consists in dissolving the metal in liquid ammonia, adding an oxid of tungsten, stirring the mixture, distilling off the ammonia and maintaining the mixture at a temperature sufficient to deprive the tungsten oxid of its oxygen.

9. The method of insuring the complete reduction of tungsten oxid, which consists in dissolving an excess of an alkali metal in liquid ammonia, adding an oxid of tungsten, stirring the mixture, distilling off the ammonia and maintaining the mixture at a temperature sufficient to complete the reduction.

Signed at New York, in the county of New York and State of New York, this 3rd day of July, A. D. 1914.

FREDERICK G. KEYES.

Witnesses:
GEORGE H. STOCKBRIDGE,
THOS. H. BROWN.